March 12, 1974  T. BLICKLE ET AL  3,796,788
METHOD FOR INTENSIFIED CONTACTING OF PLURAL FLUIDS
Original Filed July 29, 1968  2 Sheets-Sheet 1

United States Patent Office 3,796,788
Patented Mar. 12, 1974

3,796,788
METHOD FOR INTENSIFIED CONTACTING OF PLURAL FLUIDS
Tibor Blickle, Budapest, Laszlo Balla, Veszprem, and Laszlo Bacs, Budapest, Hungary, assignors to Magyar Tudomanyos Akademia Muszaki Kemiai Kutato Intezete, Veszprem, Hungary
Original application July 29, 1968, Ser. No. 748,404, now Patent No. 3,607,104, dated Sept. 21, 1971. Divided and this application Apr. 22, 1971, Ser. No. 136,488
Claims priority, application Hungary, Aug. 1, 1967, MA 1,745
Int. Cl. B01d 11/00, 11/02
U.S. Cl. 423—36
5 Claims

ABSTRACT OF THE DISCLOSURE

Different fluids are caused to flow along at least two paths separated by an upright wall having fine perforations through which the streams of different components are in contact. If the fluid is liquid it can be foamed with gas and if the fluid is a stream of particulate solids it can be fluidized. To foam or fluidize, gas can be introduced through a perforated wall from below the streams and removed above the streams.

---

This application is a division of copending application Ser. No. 748,404, filed July 29, 1968, now U.S. Pat. No. 3,607,104, issued Sept. 21, 1971.

For processes taking place in a liquid and/or gaseous phase, such as the washing of suspensions, dissolution from solid materials, partial and complete precipitation, crystallization, extraction, absorption and desorption, drying, condensing etc. numerous procedures and equipments are known. Most of these procedures use several steps, they have a low output and are tiresome, while the associated equipment is bulky, expensive and of poor efficiency.

Dialysis, a physical process, is known and used for the separation of materials consisting of large molecules or in colloidal suspension, from small molecules by making use of the differences in diffusion through certain filters, such as parchment, animal skins, etc. This process is, however, too slow and therefore cannot be rendered continuous. Hence it is unsuitable for large-scale industrial use.

No method has been known so far by which these operations could be performed in a single step, continuously and at high flow rate.

The main aim of our invention is the development of such a method.

The object of the present invention is the provision of a method for the intensification of liquid and/or gas phase contact processes.

The invention is based on the recognition that if in a chamber divided in two by a partition wall having fine perforations two different media are caused to flow, a very fast mass transfer takes place between the two media without the two media being mixed through the perforations of the partition wall. This phenomenon is independent from the ways of interaction of the media, and takes place even if the same medium is flowing on both sides of the partition wall. By the variation of the thickness of the wall and the size of the perforations, and by the selection of the flow parameters the mass transfer can be continuous.

Another discovery of particular importance was that the intensity of liquid-phase contact processes can be increased to an exceptionally high degree by making foam out of the liquid, while that of gas-phase processes can be similarly intensified by fluidizing a bed consisting of fine particles.

The essence of the process developed by us based on said discovery may be illustrated in connection with an example of the extraction of dry substances from suspensions. The conventional method for this operation includes several filterings and repeated resuspension by way of recharging. According to the invention—instead of these operations—the mud is transformed into a foam, e.g. by means of an inert gas, and caused to flow on one side of the said perforated partition wall, while washing water, likewise transformed into foam, is conducted along the other side of the partition wall. The two media are kept continuously in counterflow. The exit liquid phase of the suspension leaving the equipment will not contain contaminations any more, even with relatively short equipment.

The method according to the invention for the intensification of contact operations in the nonsolid, i.e. liquid and/or gaseous phase consists in causing the solid and/or liquid and/or gaseous materials taking part in said operation split into different operational components to flow in continuous streams simultaneously through at least two chambers arranged parallel to each other separated at least $n-1$ perforated partition walls (wherein "$n$" designates the number of chambers) having fine perforations and causing the operation to be effected by contacting the said streams of different operational components through the said perforated partition walls.

By "operational components" materials or groups of materials are understood which take part in the operation, irrespective of whether the said operation is merely a physical or a chemical one or a combination of both and irrespective of whether said materials are per se solid, liquid or gaseous materials. By "different operational components" operational components are understood which differ from each other at least in one characteristic, such as in respect of material or its physical properties. Hence, groups of materials forming an "operational component" are considered different if they differ from each other in respect of only one material of the group, or regarding any or all the physical properties of said group. According to the invention, such different operational components flow in each of the said chambers.

The term "fine perforations" indicates perforations no larger than a few millimeters. The minimum size of such perforations is given by the perforating technique and is actually a few microns. Should smaller sizes be produced at some future time, these may be similarly used.

The number of streams can be higher than the number of chambers, i.e. two streams of different operational components can enter one of the chambers or even all of the chambers.

Should the operation take place in the liquid phase, it is often advantageous to transform said liquid into a foam by means of a gas, e.g. an inert gas. In such cases said gas stream is one of the operational components, although it can be regarded as an auxiliary component.

Should a solid material be among the operational components (whether a chemical reagent in said operation or only a solid bed of inert material) it is preferable to fluidize the same by means of a gaseous or a liquid operational component, even if the same should be regarded only as an auxiliary component.

The streams can move either in counterflow or in unidirectional flow.

If necessary, heating and/or mixing can be effected.

It should also be mentioned that in some cases the top of each stream may be open.

Processes in vacuo or under pressure can be also effected according to the invention.

The invention will be described below in more detail with reference to the attached drawings by way of illustrative examples.

Figure 1:
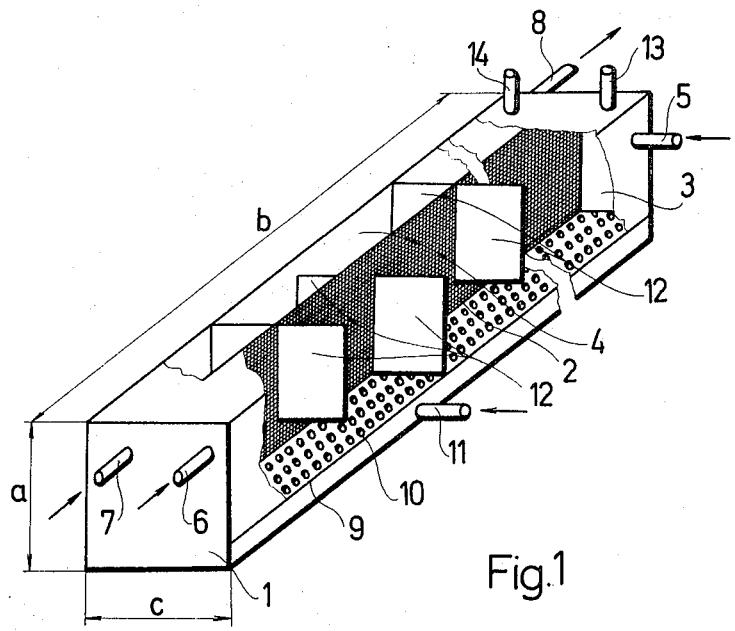
FIG. 1 shows equipment suitable for washing, dissolution and extraction and concentrating.

Referring to FIG. 1, perforated partition wall 2 divides equipment 1 into two chambers 3 and 4. The suspension or liquid to be treated enters through pipe connection 5 into chamber 3 and leaves after treatment through pipe connection 6. 7 and 8 form inlets or outlets (as the case may be) for chamber 4, i.e. if counterflow is desired 7 should be the inlet and 8 the outlet. If, however, the flow in this chamber is intended to be the same as in chamber 3, connection 8 will be the inlet and 7 the outlet. Space 9 is formed in both chambers 3 and 4 by means of a perforated bottom plate 10. Pipe connection 11 leads to said space 9 and is adapted to form an inlet for gas, e.g. an inert gas for the purpose of forming a foam or fluidizing the phases to be treated above the plate 10. The function of baffles 12 is to control the flow and to increase turbulence. At the same time these baffles divide the chambers into smaller chamber units. An equipment equipped with such dividing baffles is in practice equivalent to a row of units connected in series.

13 and 14 are gas outlets. Each chamber unit may have such outlets.

The partition wall 2 has fine perforations. It may also consist of a sieve or a mesh or a perforated plate or of any other material having holes (openings) in the range up to a few millimeters and down to the micron range. The actual size of the perforations is dependent on the materials to be handled, in case of solids taking part in the process the size will be generally determined so that solid grains should not move from one chamber into the other, or should only do so below a predetermined grain size. In case of foams the size of perforation is generally chosen to be smaller in order that the foam-forming gas should not pass through the wall. When only liquids are present in the equipment, larger sized perforations may be chosen. It is advantageous to use a partition wall which has the largest possible "free surface," i.e. the ratio of perforations to nonperforated parts should be as large as possible.

As to the perforated bottom plate, the perforations of these differ from that of the partition wall. The perforations of this plate serve only for the distribution of gas or fluid in their inlet or outlet flow, and not for effecting the operation, hence any perforated plate used for such purposes can be equally well used in the equipment.

In order to show by the examples some possible sizes of the equipment itself, $a$, $b$ and $c$ dimensions have been marked in FIG. 1.

Figure 2:
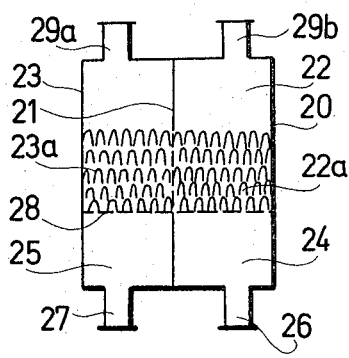
FIGS. 2 to 4 are schematic representations of variants of the equipment suitable for different operations, shown in vertical sections.

FIG. 2 represents a schematic illustration in the form of a vertical section of a variant of the equipment shown in FIG. 1. As may be seen from FIG. 2, this equipment has a smaller number of inlets and outlets than that of FIG. 1, and no baffle plates are provided.

In FIG. 2 the equipment 20 is divided by a perforated partition wall 21 into chambers 22 and 23. Bottom plate 28 forms spaces 24 and 25. Pipe connections 26 and 27 form inlets through said spaces 24 and 25 to chambers 22 and 23 for gases and, if necessary, outlets through the same way for liquids. Pipe connections 29a and 29b form outlets for gases from chambers 22 and 23 or inlets for liquids into these chambers. If required, these two connections may be united into a single connection but leading into both chambers. In some cases the diameter of the pipe connection can be equal to that of the chamber, i.e. the chambers can be open at their top.

22a and 23a designates foam formed in both chambers.

The simplified variant according to FIG. 2 can be mainly used if no solid materials take part in the operation.

Figure 3:
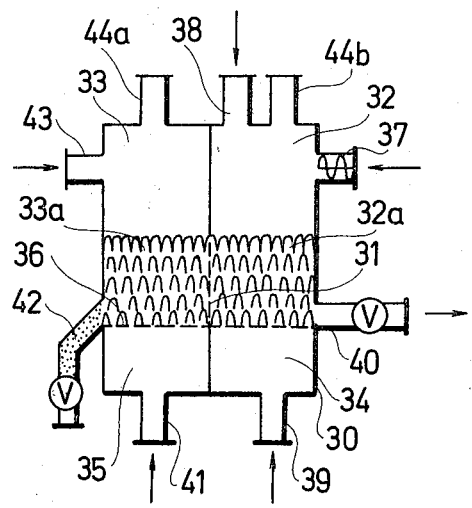

FIG. 3 shows another variant of the equipment according to FIG. 1 in a schematic representation in vertical section. This variant is advantageous where combined operations with solid materials are to be effected in the nonsolid phase.

Equipment 30 is divided by perforated partition wall 31 into chambers 32 and 33, and perforated bottom plate 36 forms spaces 34 and 35. Each chamber has several inlets and outlets, and these are following:

Inlet 37 serves for feeding solids, e.g. with the aid of a feeding screw into chamber 32. Pipe connection 38 is an inlet for liquids into the same chamber. 39 and 41 are lead-in pipe connections for gas to chambers 32 and 33 via spaces 34 and 35, respectively. 43 is an inlet pipe connection for liquids into chamber 33. Pipe connections 40 and 42 are outlets from chambers 32 and 33 for solid materials or liquid-solid suspensions, respectively. They should preferably have cocks. Pipe connections 44a and 44b are gas outlets from chambers 32 and 33. They can be united into a single connection for both chambers. 32a and 33a designate the foam formed.

Figure 4:
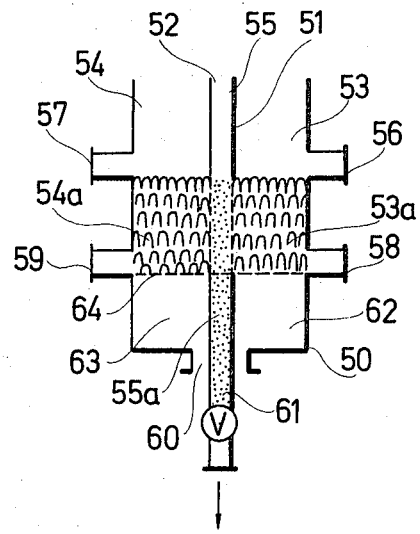

The variant according to FIG. 4 (which is also a schematic representation in a vertical section) shows equipment with three chambers and with an open top. Perforated partition walls 51 and 52 form chambers 53, 54 and 55 in the equipment 50. Pipe connections 56 and 58 form inlets and/or outlets to chamber 53, pipe connections 57 and 59 to chamber 54. By the bottom plate 64 spaces 62 and 63 are formed. 60 is a common gas lead-in pipe connection for these spaces. 61 is a solids outlet pipe connection from chamber 55. 53a and 54a designate the foam, 55a the solids in the respective chambers. The equipment is open at the top thus allowing the gas to leave there.

The operation of the equipment will be seen in more detail in connection with the examples. Other variations, not illustrated, may be designed according to the requirements of the desired operation.

EXAMPLE 1

Equipment according to FIG. 1 has a total length (dimension $b$) of 330 cm., with a height (dimension $a$) of 50 cm., and a width (dimension $c$) of 4 cm. It is equipped with 32 pairs of baffles thus forming 33 chamber units connected in series, each having a length of 10 cm. The partition wall 2 is a fine sieve with 5 micron holes. The upper part of this wall need not be perforated, e.g. about 15–20 cm. at the top may be nonperforated.

Into this equipment at a flow rate of 1 m.$^3$/h. a phosphoric acid solution of a concentration of 30% containing 200 g./l. of gypsum (originating from dissolving phosphate rocks with sulphuric acid) is fed in through pipe connection 5 in a continuous stream. The gypsum has a grain size of e.g. 6–100 microns. Into the other chamber 4 washing water is fed in through pipe connection 7 in a continuous flow of 1 m.$^3$/hour. In order to form a foam 240 m.$^3$/hour air is admitted through pipe connection 11. This gas stream is at a pressure of 410 millimeters of water.

The operational components flowing in counter current in the chambers contact with each other along the wall 2. In both chambers these components will be present in form of a foam. All operational components are at room temperature.

Due to the contacting of said operational components, phosphoric acid will pass through the wall 2 from chamber 3 in direction of chamber 4. This phosphoric acid will leave chamber 4 at outlet 8, diluted to a concentration of 28.5%, at a flow rate of 1 m.$^3$/hour, while the gypsum washed out from the phosphoric acid leaves the chamber 3 at outlet 6. The phosphoric acid content of the departing gypsum mud will be about 1.5%.

Foaming gas leaves the chamber at gas outlets 13, 14.

An even lower phosphoric acid content of the gypsum mud can be achieved by using longer equipment with, e.g. 50 chamber units if such a lower content is desired from the economical point of view.

EXAMPLE 2

In the same equipment as in Example 1 but with a length (dimension $b$) of 400 cm. (i.e. 40 chamber units) 1 m.$^3$/h. of an aqueous mud containing 150 g./l. chromium oxide green pigment (grain size 6–100 microns) and potassium sulphate is fed in through inlet 5 in a quantity to form a solution of 50% concentration. Into the other chamber simultaneously washing water is led in through pipe connection 7 in counter current with a speed of 1 m.$^3$/h. Both operational compounds are at room temperature. Foam is formed as in Example 1 by 288 m.$^3$/hour air passing with a pressure of 440 mm. of water. One m.$^3$/hour mud having a content of 150 g./l. chromium oxide green and only 2% of potassium sulphate leaves chamber 3 through outlet 6 while potassium sulphate solution with a concentration of 48% leaves at outlet 8. Gas leaves at outlets 13 and 14.

EXAMPLE 3

Into the equipment shown in FIG. 2 having the dimensions $a=50$ cm., $b=6$ cm., $c=4$ cm. and a perforated partition wall 21 having a perforated surface of 25 cm.$^2$ (rest unperforated) with perforations sized 30 microns the following operational components are fed in:

Chamber 22 is filled with 50 cm.$^3$ nitrobenzene and chamber 23 with 50 cm.$^3$ 0.1 normal iodine solution having a 25 g./l. KJ content. Air is fed in through inlets 26 and 27 in a continuous stream with a speed causing a continuous stream in the chambers 22 and 23 having a speed of 0.5 m./sec. After an hour of operation half of the total iodine content of chamber 23 will pass into the nitrobenzene in chamber 22 without forming a nitrobenzene-water emulsion in either of the chambers. Air leaves the chambers continuously through outlets 29$a$ and 29$b$, while after finishing the operation and having stopped the foam forming air stream, the contents of each chamber is let out through pipe connections 26 and 27.

The same process can be carried out also in equipment similar to that of FIG. 1 in which case the nitrobenzene and the iodine solution can be fed in in a continuous stream.

EXAMPLE 4

Equipment is used which has the following dimensions: $a=50$ cm., $b=300$ cm., $c=150$ cm. and is equipped with inlets and outlets according to FIG. 3. The partition wall 31 has 10 micron holes throughout a surface of 1 m.$^2$ and is mounted so that chamber 32 is smaller than chamber 33 in such a manner that from the total dimension of $c$ 70 cm. refers to chamber 32 and 80 cm. to chamber 33.

Into chamber 32 a residual product achieved by burning 10 tons/hour of a 5% copper-containing ore in the so-called sulphating roasting process is fed in through inlet 37 to replenish the losses. The mud is foamed at a rate of 10,000 m.$^3$/hour air at a temperature of 130° C., led in through pipe connection 3. In this chamber the cupric sulphate is dissolved from the mud. The inactive residue of the process is discharged with a 500 g./l. concentration through connection 40.

The dissolved Cu(SO$_4$) gets into chamber 33, and a foam is formed there, with the aid of a dry air stream having a temperature of 15° C. Due to the cooling and vaporization CuSO$_4$·5H$_2$O crystals are formed. These leave chamber 33 through connection 42 with a concentration of 500 g./l.

The crystals are filtered, dried and the liquid recirculated in the equipment (e.g. through connection 43). Connections 44$a$ and 44$b$ are air outlets.

The residue leaving by connection 40 can be washed, e.g. by the method according to Example 2, and this washing water can be used as water in chamber 32, fed in through connection 38.

The output of the process is a quantity of cupric sulphate corresponding to 1250 kg. water-free product.

EXAMPLE 5

A burnt pyrite-residue containing 2% of copper content is reburnt according to the so-called sulphating roasting. The product of 50 kg. raw material of this procedure is led into chamber 32 of equipment according to FIG. 3 having the following dimensions: $a=50$ cm., $b=60$ cm., $c=20$ cm. and a wall 31 made out of a sieve with 20 micron openings. Water is continuously replenished. In chamber 32 the copper content is dissolved, and the solution will have a copper concentration of 30%.

A mud of 200 g./l. iron filings is fed into chamber 33 which serves for the cementation of the copper content of the solution. For the compensation of the iron losses 900–950 grams of iron filings are added, and in both chambers a foam is formed by a 0.7 m./sec. fast air stream. Through connection 42 1 kg./hour of cementated copper can be taken out in the form of a 500 g./l. mud, while the inactive mud is removed in the same concentration (through connection 40). The mud leaving connection 42 is filtered, washed and dried, that from connection 40 filtered. The liquid residue of both filter processes can be used as washing water in chamber 32.

EXAMPLE 6

In equipment according to FIG. 2 with dimensions of $a=50$ cm., $b=6$ cm., $c=4$ cm., and a wall 21 with a sieve surface of 25 cm.$^2$ and holes of 45 microns, 100 ml. of water is fed in. A foam is formed with the aid of a residual gas of sulphuric acid production containing 3% SO$_2$ in chamber 22. This gas enters through connection 26 with a speed of 2 m.$^3$/hour and leaves chamber 22 at connection 29$b$ with an SO$_2$ content of 1.7%.

The water carries the absorbed SO$_2$ content over into chamber 23. In this chamber a foam is formed by an air stream of 2000 l./hour through connection 27. The air leaving chamber 23 at connection 29$a$ will have an SO$_2$ content of 1.3%. The pressure drop of the residual gas will be 95–100 mm. of water.

EXAMPLE 7

In equipment according to FIG. 3 with dimensions of $a=50$ cm., $b=6$ cm., $c=4$ cm. a mud containing iron oxide red pigments of 100 micron grain size in a 100 g./l. concentration is fed in with a 48 l./hour speed. Eight l. of a 600 g./l. mud can be taken off at the bottom of the chamber in which this mud was fed in. 40 l./h. of water can be taken off from the other chamber, 5 m.$^3$/h. air was used for foaming.

EXAMPLE 8

In equipment as described in Example 1 but having 20 micron openings instead of 5 micron openings, the following operation is effected.

One m.$^3$/h. of a mud containing 200 g./l. sand and clay at a sand-clay ratio of 10:1 or more is fed into chamber 3. Through chamber 4 1 m.$^3$/h. water flows in counter current. Foaming is effected as in Example 1. The grain size of the sand was about 100 microns, that of the clay below 20 microns.

Due to the operation the clay content of the mud in chamber 3 decreases to 2% of the original, and 1 m.$^3$/h. of such clay-poor mud leaves this chamber. The clay is enriched in chamber 4, and water containing clay but not sand leaves chamber 4.

As can be seen from the examples, the method according to the invention can be used in different technical fields and for different purposes. According to the purpose and in conformity with the circumstances a part of the materials taking part in the operation may be put into the chambers and their continuous "flow" is only secured by leading in foaming air. This, however, does not alter the fact that from the point of view of the operation they form a continuous flow, hence in the present specification and claims this expression is to be understood accordingly.

It has to be noted that although different examples are described for the process we do not limit the scope of the present invention to these. So in FIG. 4 lead chromate can be produced by introducing lead nitrate into chamber 53, potassium chromate into chamber 54 and inert gas at 60. The lead chromate itself is formed in chamber 55 and leaves this chamber through 61. According to other examples, besides foaming air other auxiliary materials, silica gel can also be used. With the aid of air not only foams but also fluidized solid beds can be formed. All these and similar embodiments naturally also fall within the scope of the present invention.

Having described our invention, we claim:

1. A method for intensified contacting of plural fluid streams, comprising flowing a plurality of different fluid streams relative to each other through a substantially horizontally elongated column with the streams in contact with each other only through a vertical wall having a multiplicity of fine openings therethrough, at least one of said streams moving horizontally, passing gas into and upwardly through said at least one stream through a horizontal plate having a multiplicity of fine openings therethrough disposed beneath said at least one stream thereby to increase the intensity of the contact operation, said at least one stream with said gas passing upwardly therethrough being at least biphasic, and withdrawing gas from above said at least one stream.

2. A method as claimed in claim 1, in which said at least one stream is a stream of finely divided solid material and said gas fluidizes said stream.

3. A method as claimed in claim 1, in which said at least one stream is in liquid phase and said gas causes said liquid phase stream to foam.

4. A method as claimed in claim 1, and causing said at least one stream to follow a sinuous path.

5. A method as claimed in claim 1, in which said streams are at least three in number, with a central one said stream disposed between two other said streams, said central stream comprising particulate solid material moving downwardly.

References Cited

UNITED STATES PATENTS

| 2,851,396 | 9/1958 | Myers | 23—270.5 |
| 3,313,240 | 4/1967 | Bentov | 23—267 C |
| 3,409,125 | 11/1968 | Bezemer | 23—270 |

FOREIGN PATENTS

| 111,234 | 1964 | Czechoslovakia | 23—267.3 |

NORMAN YUDKOFF, Primary Examiner

S. J. EMERY, Assistant Examiner

U.S. Cl. X.R.

23—271, 270, 270.5; 55—73; 261—124, 23, 123; 423—54, 150, 181, 321, 501, 595